(12) United States Patent
Yamamoto et al.

(10) Patent No.: US 7,534,031 B2
(45) Date of Patent: May 19, 2009

(54) TEMPERATURE MEASURING DEVICE AND TEMPERATURE MEASUREMENT METHOD

(75) Inventors: Yoshinori Yamamoto, Yokohama (JP); Itaru Sakabe, Yokohama (JP); Eisuke Sasaoka, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 166 days.

(21) Appl. No.: 11/791,365

(22) PCT Filed: Oct. 5, 2006

(86) PCT No.: PCT/JP2006/319955

§ 371 (c)(1),
(2), (4) Date: May 23, 2007

(87) PCT Pub. No.: WO2007/043432

PCT Pub. Date: Apr. 19, 2007

(65) Prior Publication Data

US 2008/0130707 A1 Jun. 5, 2008

(30) Foreign Application Priority Data

Oct. 7, 2005 (JP) ............................. 2005-295517

(51) Int. Cl.
*G01J 5/00* (2006.01)
(52) U.S. Cl. .................. 374/130; 356/32; 374/E17.002
(58) Field of Classification Search ................. 374/131, 374/130, 137; 356/32
See application file for complete search history.

(56) References Cited

U.S. PATENT DOCUMENTS 4,448,547 A * 5/1984 Wickersheim ............. 374/131

(Continued)

FOREIGN PATENT DOCUMENTS

JP 4-77641 A 3/1992

(Continued)

OTHER PUBLICATIONS

International Preliminary Report on Patentability and Written Opinion of the International Searching Authority, issued in corresponding International Patent Application No. PCT/JP2006/319955, mailed Apr. 17, 2008.

(Continued)

*Primary Examiner*—Andre J Allen
(74) *Attorney, Agent, or Firm*—McDermott Will & Emery LLP (57) ABSTRACT

The temperature measuring device of the present invention comprises: a light source for outputting light; an optical fiber to which light outputted by the light source is inputted and from which Brillouin scattered light is outputted; a detection unit for detecting a spectrum of the Brillouin scattered light; a judgment unit for judging whether or not a frequency shift of the spectrum of the Brillouin scattered light detected by the detection unit belongs to a specific region in which the rate of change of the frequency shift with respect to the temperature of the optical fiber is smaller than a predetermined value; and an analysis unit for, when the judgment unit judges that the frequency shift does not belong to the specific region, analyzing the temperature in use of the frequency shift, and for, when the judgment unit judges that the frequency shift belongs to the specific region, not performing analysis, or analyzing the temperature in use of at least the linewidth of the spectrum of the Brillouin scattered light detected by the detection means.

6 Claims, 9 Drawing Sheets

U.S. PATENT DOCUMENTS

| | | | |
|---|---|---|---|
| 7,170,590 B2 * | 1/2007 | Kishida | 356/32 |
| 2004/0208413 A1 | 10/2004 | Scandale et al. | |
| 2006/0018586 A1 * | 1/2006 | Kishida | 385/12 |
| 2006/0165344 A1 * | 7/2006 | Mendez et al. | 385/13 |

FOREIGN PATENT DOCUMENTS

| | | |
|---|---|---|
| WO | WO 02/093120 A1 | 11/2002 |

OTHER PUBLICATIONS

Marc Nikles et al., Brillouin Gain Spectrum Characterization in Single-Mode Optical Fibers, Journal of Lightwave Technology, vol. 15, No. 10, Oct. 1997, IEEE, pp. 1842-1851.

L. Thevenaz et al., "Brillouin gain spectrum characterization in optical fibers from 1 to 1000 K," Technical Digest, 16th International Conference on Optical Fiber Sensors, Oct. 13-17, 2003, Tu 2-2, Japan, pp. 38-41.

* cited by examiner

TEMPERATURE MEASURING DEVICE AND TEMPERATURE MEASUREMENT METHOD

RELATED APPLICATIONS

This application is the U.S. National Phase under 35 U.S.C. § 371 of International Application No. PCT/JP2006/319955, filed on Oct. 5, 2006, which in turn claims the benefit of Japanese Application No. 2005-295517, filed on Oct. 7, 2005, the disclosures of which Applications are incorporated by reference herein.

TECHNICAL FIELD

The present invention relates to a temperature measuring device and to a temperature measurement method.

BACKGROUND ART

In a known conventional technology, temperature is measured by detecting and using the frequency shift of Brillouin scattered light outputted from an optical fiber to which light is inputted (Non-patent reference 1). Brillouin scattering is a light scattering phenomenon caused by interaction between light in an optical fiber and sound waves in the optical fiber. The technology described in Non-patent reference 1 below utilizes changes in the spectrum of Brillouin scattered light with respect to the temperature of the optical fiber.

Reference 1 below, in particular, describes that the frequency shift of Brillouin scattered light changes linearly with respect to temperature in a temperature region around 230 to 370K. Reference 2 below, also, describes that frequency shift takes an extreme value around 60K to 90K.

Non-patent reference 1: Marc Nikles et al. "Brillouin gain spectrum characterization in Single-Mode optical fibers", JOURNAL OF LIGHTWAVE TECHNOLOGY, VOL. 15, NO. 10, October 1997

Non-patent reference 2: L. Thevenaz et al., "Brillouin gain spectrum characterization in optical fibers from 1 to 1000K", Technical Digest, 16th International Conference on Optical Fiber Sensors, Oct. 13-17, 2003, Tu 2-2, p. 38-41

DISCLOSURE OF THE INVENTION

Problem(s) to be Solved by the Invention

That is, according to Non-patent reference 2, measurement precision decreases in a temperature region up to 200K, including 60K to 90K, owing to the small change of frequency shift vis-à-vis temperature.

In order to solve the above problem, it is an object of the present invention to provide a temperature measuring device and a temperature measurement method that allow analyzing more accurately the temperature of a low-temperature region using Brillouin scattering.

Means for Solving the Problem(s)

The temperature measuring device according to the present invention comprises a light source for outputting light; an optical fiber to which light outputted by the light source is inputted and from which Brillouin scattered light is outputted; detection means for detecting a spectrum of the Brillouin scattered light; judgment means for judging whether or not a frequency shift of the spectrum of the Brillouin scattered light detected by the detection means belongs to a specific region in which the rate of change of the frequency shift with respect to the temperature of the optical fiber is smaller than a predetermined value; and analysis means for, when the judgment means judges that the frequency shift does not belong to the specific region, analyzing the temperature in use of the frequency shift, and for, when the judgment means judges that the frequency shift belongs to the specific region, not performing analysis, or analyzing the temperature in use of at least a linewidth of the spectrum of the Brillouin scattered light detected by the detection means.

The temperature measurement method according to the present invention comprises a detection step of inputting light to an optical fiber and detecting a spectrum of Brillouin scattered light outputted from the optical fiber in response to the light input; a judgment step of judging whether or not a frequency shift of the spectrum of the Brillouin scattered light detected in the detection step belongs to a specific region in which the rate of change of the frequency shift with respect to the temperature of the optical fiber is smaller than a predetermined value; and an analysis step of, when in the judgment step it is judged that the frequency shift does not belong to the specific region, analyzing the temperature in use of the frequency shift, and for, when in the judgment step it is judged that the frequency shift belongs to the specific region, not performing analysis, or analyzing the temperature in use of at least the linewidth of the spectrum of the Brillouin scattered light detected in the detection step.

In the temperature measuring device and temperature measurement method of the present embodiment it is judged whether or not the frequency shift of the detected Brillouin scattered light spectrum belongs to a specific region, which allows grasping whether or not the detected frequency shift belongs to a region in which the rate of change of the frequency shift relative to temperature in the optical fiber is smaller. When it is judged that the detected frequency shift does not belong to a specific region, the temperature of the optical fiber is analyzed using the detected frequency shift, which allows performing an accurate temperature analysis. When it is judged that the detected frequency shift belongs to the specific region, temperature is analyzed using at least the linewidth, or no analysis is performed; hence, in case of lessened precision as a result of analyzing temperature using frequency shift alone, the temperature is either analyzed using at least the linewidth or no analysis is carried out. An accurate procedure can thus be carried out.

Preferably, the temperature measuring device of the present invention further comprises storage means for storing beforehand region information relating to whether a frequency shift belongs to the specific region, wherein the judgment means performs judgment on the basis of the region information.

Region information is thus stored beforehand, and judgment can be performed more efficiently since the detected frequency shift is judged to belong or not to a specific region on the basis of the region information and of the frequency shift of the Brillouin scattered light spectrum detected by the detection means.

In the temperature measurement method of the present invention, preferably, the specific region used for judgment by the judgment unit is a region comprising a frequency shift that satisfies the relationship between frequency shift $v_B(T)$ and temperature T denoted by Formula (1) below.

[Formula 1]

$$\left|\frac{dv_B(T)}{dT}\right| = 0 \quad (1)$$

Since the region comprising the frequency shift satisfying Formula (1) is taken as the specific region, the temperature is analyzed using a frequency shift that excludes at least the case where the frequency shift takes an extreme value. This allows performing accurate temperature analysis.

In the temperature measuring device of the present invention, also, the specific region used for judgment by the judgment means is preferably a region comprising a frequency shift $v_B(T)$ that satisfies the relationship between frequency shift $v_B(T)$, linewidth $\Delta v_B(T)$ and temperature T denoted by Formula (2) below:

[Formula 2]

$$\left|\frac{dv_B(T)}{dT}\right| < \left|\frac{d\Delta v_B(T)}{dT}\right| \quad (2)$$

This allows judging whether the frequency shift belongs to the specific region, at least when the temperature derivative of the detected frequency shift is smaller than the temperature derivative of the detected linewidth, and hence temperature analysis can be carried out more accurately.

In the temperature measurement method of the present invention is preferably measured the temperature distribution along the longitudinal direction of the optical fiber. The temperature distribution along the longitudinal direction of the optical fiber can be measured using a BOTDR (Brillouin Optical Time Domain Reflectometry) device, a BOTDA (Brillouin Optical Time Domain Analysis) device, a BOCDA (Brillouin Optical Correlation Domain Analysis) device or the like.

Effect of the Invention

The present invention allows analyzing more accurately the temperature of a low-temperature region using Brillouin scattering.

DESCRIPTION OF THE REFERENCE NUMERALS 1, 1A temperature measuring device
5, 5A, 5B object to be measured
10, BOTDR device, 10A BOTDA device
11,11A light source
12 optical fiber
13,13A detection unit
14 storage unit
15 judgment unit
16 analysis unit

BEST MODE FOR CARRYING OUT THE INVENTION

A best mode for carrying out the invention is explained next in detail with reference to accompanying drawings. In the explanation, identical elements will be referred to with identical reference numerals, without repeating their overlapping descriptions.

Figure 1:
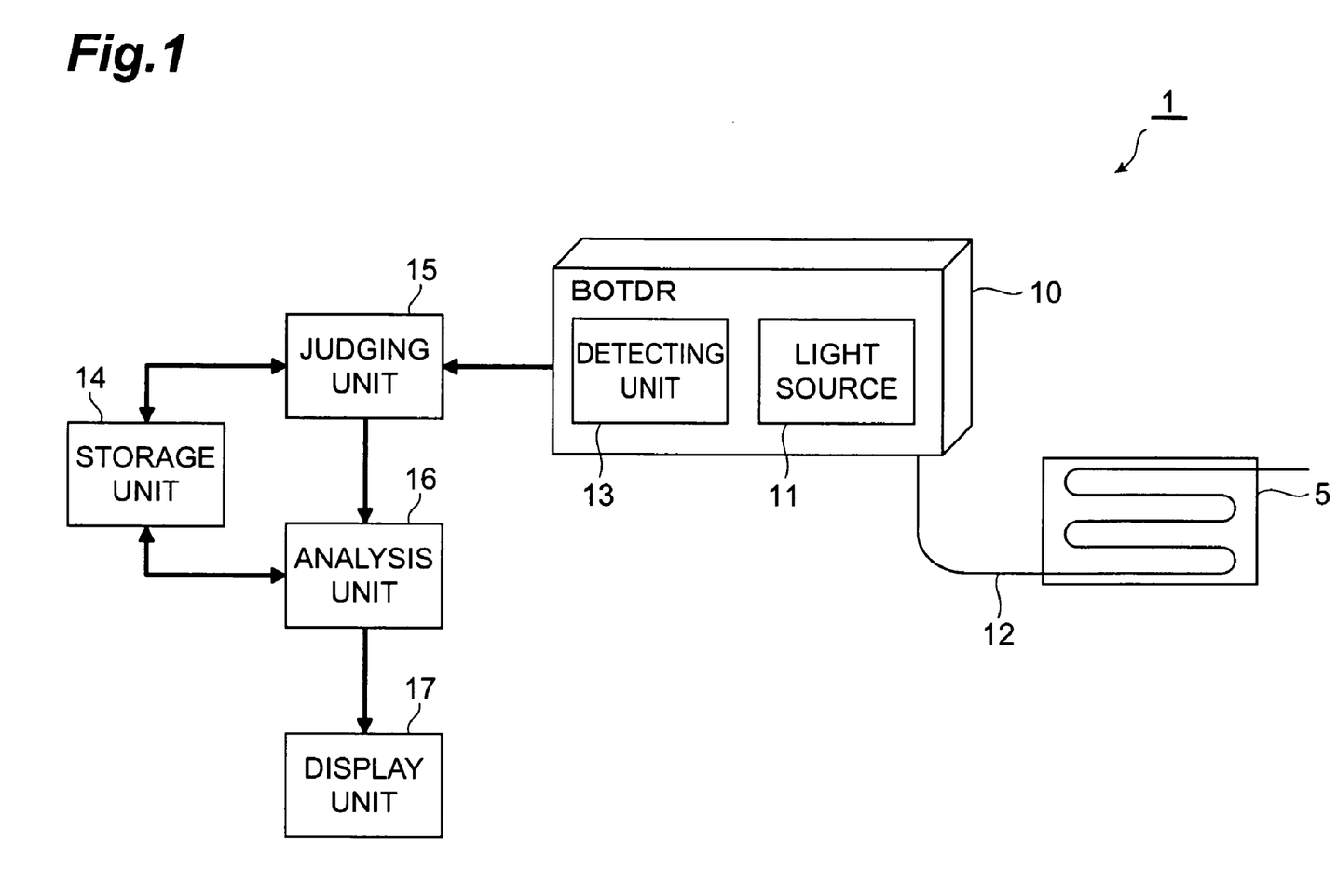
FIG. 1 is a schematic diagram of a temperature measuring device according to the present embodiment.

The temperature measuring device according to the present embodiment will be explained first. FIG. 1 is a schematic diagram of a temperature measuring device 1 according to the present embodiment. The temperature measuring device 1 for measuring the temperature of an object to be measured 5 comprises a BOTDR device 10, an optical fiber 12, a storage unit 14 (storage means), a judgment unit 15 judgment means), and an analysis unit 16 (analysis means). The temperature region to be measured by the temperature measuring device 1 is a low-temperature region up to about 200 K.

The BOTDR device 10, which has a light source 11 and a detection unit 13 (detection means), and is connected to the optical fiber 12, measures the Brillouin scattered light outputted by the optical fiber 12 as a function of time. The light source 11 outputs pump light. The pump light outputted by the light source 11 is inputted to the optical fiber 12, which outputs backscattered light comprising Brillouin scattered light. A portion of the optical fiber 12 is arranged to be in contact with the surface of the object to be measured 5. In the present embodiment, the optical fiber 12 is arranged in meanders that touch the surface of the object to be measured 5. In such an arrangement, a longer region of the optical fiber is in contact with the object to be measured, along the longitudinal direction of the optical fiber 12.

The detection unit 13 detects at various times the spectrum of the Brillouin scattered light outputted from the incidence end of the pump light in the optical fiber 12. The spectrum $g_B(v)$ of the Brillouin scattered light detected by the detection unit 13 is given by the Lorentzan spectrum of Formula (3), with v denoting the frequency difference between the Brillouin scattered light and the pump light.

[Formula 3]

$$g_B(v) = \frac{g_0}{1 + \{2(v - v_B)/\Delta v_B\}^2} \quad (3)$$

In Formula (3), $g_0$, $v_B$, and $\Delta v_B$ are parameters that characterize the spectrum of Brillouin scattered light, namely maximum gain of the Brillouin scattered light spectrum, frequency shift (in the present description, frequency shift denotes the frequency difference between the pump light frequency and the peak frequency of the Brillouin spectrum), and linewidth. The detection unit 13 outputs to the judgment unit 15 information indicating the frequency shift of the detected Brillouin scattered light spectrum and information indicating the linewidth.

In the storage unit 14 is stored beforehand information relating to whether or not the frequency shift belongs to a below-described specific region.

Figure 2:
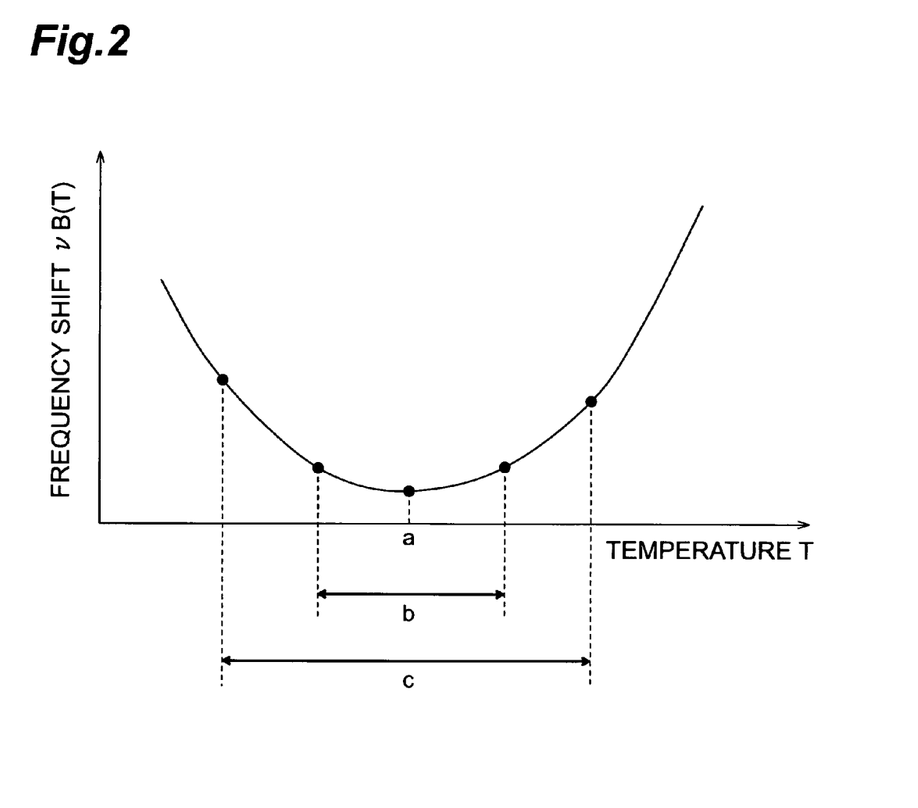
FIG. 2 is a graph illustrating the relationship between temperature and frequency shift of an optical fiber 12 comprised in the temperature measuring device according to the present embodiment.

The relationship between temperature and the frequency shift of the Brillouin scattered light spectrum in the optical fiber 12, as well as region information, is explained next with reference to FIG. 2. FIG. 2 is a graph illustrating the relationship between the frequency shift of the Brillouin scattered light spectrum and the temperature in the optical fiber 12. The Y-axis represents frequency shift $v_B(T)$, and the X-axis represents the temperature T. The temperature range illustrated in FIG. 2 is around 60 to 90K.

As illustrated in FIG. 2, the frequency shift $v_B(T)$ has an extreme value around 60 to 90 K, and changes non-linearly with respect to temperature in a low-temperature region. Specifically, the frequency shift $v_B(T)$ has a small rate of change vis-à-vis the temperature T around 60 to 90 K. In the temperature region outside the vicinity of the low-temperature region from 60 to 90 K, the rate of change of the frequency shift $v_B(T)$ with respect to the temperature T increases, and the frequency shift $v_B(T)$ changes linearly with respect to temperature T. The linewidth of the Brillouin scattered light spectrum changes linearly with respect to the temperature T in the temperature region of around 60 to 90K.

The above specific region corresponds to a region in which the rate of change of the frequency shift with respect to temperature is small. In concrete terms, the specific region is a region comprising a region a corresponding to a frequency shift $v_B(T)$ such that the temperature derivative thereof satisfies Formula (4) below.

[Formula 4]

$$\left|\frac{dv_B(T)}{dT}\right| = 0 \quad (4)$$

That is, the region a corresponds to a region in which the rate of change of the frequency shift $v_B(T)$ with respect to temperature is zero.

The specific region, for instance, is a region b or a region c corresponding to a frequency shift $v_B(T)$ such that the temperature derivative of the frequency shift $v_B(T)$ satisfies Formula (5) or Formula (6) below.

[Formula 5]

$$\left|\frac{dv_B(T)}{dT}\right| \leq 0.1 \times \left|\frac{dv_B(25°\text{ C.})}{dT}\right| \quad (5)$$

[Formula 6]

$$\left|\frac{dv_B(T)}{dT}\right| \leq 0.5 \times \left|\frac{dv_B(25°\text{ C.})}{dT}\right| \quad (6)$$

That is, the region b corresponds to a region in which the rate of change of the frequency shift $v_B(T)$ with respect to temperature is no larger than 1/10 of the rate of change at 25° C. (298K). The region c corresponds to a region in which the rate of change of the frequency shift $v_B(T)$ with respect to temperature is no larger than half the rate of change at 25° C. (298K). For instance, the rate of change of the frequency shift with respect to temperature in the region b is of about 0.136 MHz/K or less, while the rate of change of the frequency shift with respect to temperature in the region c is of about 0.68 MHz/K or less.

Also, the specific region may be a region corresponding to a frequency shift $v_B(T)$ such that the temperature derivative thereof satisfies Formula (7) below.

[Formula 7]

$$\left|\frac{dv_B(T)}{dT}\right| \leq \left|\frac{dv_B(25°\text{ C.})}{dT}\right| \quad (7)$$

That is, the region denoted by Formula (7) corresponds to a region in which the rate of change of the frequency shift $v_B(T)$ with respect to temperature is no larger than the rate of change at 25° C. (298K).

The relationship between temperature and frequency shift in the optical fiber 12 illustrated in FIG. 2 allows determining beforehand whether frequency shifts at various temperatures belong or not to a specific region. The storage unit 14 stores beforehand region information indicating whether or not a frequency shift belongs to a specific region. The storage unit 14 also stores beforehand, linewidths and frequency shifts in the optical fiber 12 at various temperatures, associated to one another.

Returning to FIG. 1, the judgment unit 15 determines whether the frequency shift indicated in the information outputted by the detection unit 13 belongs or not to a specific region. The judgment unit 15 performs such a judgment on the basis of the above-described region information. The judgment unit 15 outputs to the analysis unit 16 the judgment result as well as information indicating the frequency shift outputted by the detection unit 13 and information indicating the linewidth.

The analysis unit 16 analyzes the temperature of the object to be measured 5 on the basis of the judgment result outputted by the judgment unit 15. When the judgment result from the judgment unit 15 indicates that the frequency shift does not belong to the specific region, the analysis unit 16 analyzes the temperature of the optical fiber 12 using the frequency shift outputted by the judgment unit 15. Specifically, the analysis unit 16 acquires from the storage unit 14 temperature information indicating the temperature that corresponds to the frequency shift outputted by the judgment unit 15.

When the judgment result from the judgment unit 15 indicates that the frequency shift belongs to the specific region, the analysis unit 16 analyzes the temperature of the optical fiber 12 using at least the linewidth outputted by the judgment unit 15. Specifically, the analysis unit 16 acquires from the storage unit 14 temperature information indicating the temperature that corresponds to the linewidth outputted by the judgment unit 15.

The analysis unit 16 analyzes the temperature of the object to be measured 5 using the temperature information of the optical fiber 12, and outputs to the exterior the analysis result. For instance, the analysis unit 16 outputs the analysis result to a display unit 17 (display means) on which the temperature indicated by the analysis results is displayed.

Figure 3:
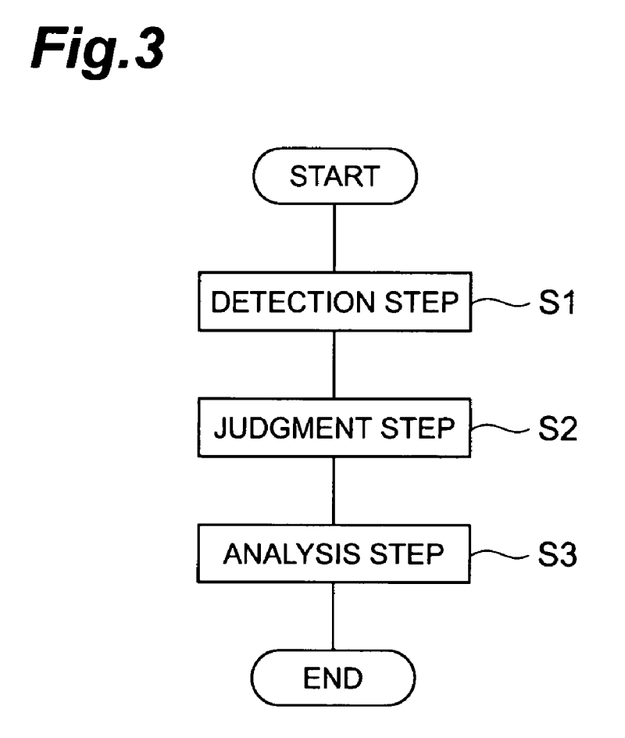
FIG. 3 is a flowchart of the temperature measuring method according to the present embodiment.

A temperature measurement method according to the present embodiment will be explained next with reference to FIG. 3 based on the explanation of the operation of the temperature measuring device 1 according to the present embodiment. FIG. 3 is a flowchart of the temperature measurement method according to the present embodiment. This temperature measurement method is a method for measuring the temperature of the object to be measured 5 using the temperature measuring device 1. The temperature region measured in the temperature measurement method is a low-temperature region of about not more than 200K.

In the temperature measurement method, region information is stored beforehand in the storage unit 14, and then the temperature is measured over a detection step S1, a judgment step S2 and an analysis step S3. In the detection step S1, firstly, the pump light outputted by the light source 11 is inputted to the optical fiber 12. The detection unit 13 detects the Brillouin scattered light spectrum outputted from the pump light incidence end of the optical fiber 12 in response to the incident pump light. Upon detection of the Brillouin scattered light spectrum, the detection unit 13 outputs to the judgment unit 15 information indicating the linewidth and frequency shift of the Brillouin scattered light spectrum.

After the detection step S1, in the judgment step S2 the judgment unit 15 determines whether or not the frequency shift outputted by the detection unit 13 belongs to a specific region. This is judged on the basis of the region information stored in the storage unit 14. Upon judgment, the judgment unit 15 outputs the judgment result to the analysis unit 16.

After the judgment step S2, in the analysis step S3, the temperature of the object to be measured 5 is analyzed in accordance with the judgment result outputted by the judgment unit 15. When the judgment unit 15 outputs a judgment result indicating that the frequency shift does not belong to the specific region, the analysis unit 16 acquires from the storage unit 14 temperature information corresponding to the frequency shift outputted by the judgment unit 15. When the judgment 5 unit 15 outputs a judgment result indicating that the frequency shift belongs to the specific region, the analysis unit 16 acquires from the storage unit 14 temperature information corresponding to the linewidth outputted by the judgment unit 15. The analysis unit 16 analyzes the temperature of the object to be measured 5 on the basis of the acquired temperature information, and outputs to the exterior the analysis result. For instance, the analysis result is outputted to a display means on which the temperature indicating the analysis result is displayed.

In the temperature measuring device 1 and the temperature measurement method of the present embodiment, the judgment unit 15 judges whether or not the frequency shift of the detected Brillouin scattered light spectrum belongs to a specific region, which allows grasping whether or not the detected frequency shift belongs to a region in which the rate of change of the frequency shift relative to temperature in the optical fiber 12 is smaller. When it is judged that the detected frequency shift does not belong to the specific region, the analysis unit 16 analyzes the temperature of the optical fiber 12 using the detected frequency shift, which allows performing an accurate temperature analysis. When it is judged that the detected frequency shift belongs to the specific region, the analysis unit 16 either analyzes the temperature of the optical fiber 12 using at least the linewidth, or does not perform analysis, so that, in case of lessened precision as a result of analyzing temperature using frequency shift alone, the temperature is either analyzed using the linewidth or no analysis is performed. An accurate procedure can thus be carried out.

Also, the frequency shift and region information are stored beforehand associated to each other, so that the judgment unit 15 judges whether or not a detected frequency shift belongs to a specific region on the basis of the region information and of the frequency shift of the Brillouin scattered light spectrum detected in the detection step S1, which allows performing the judgment more efficiently.

Since the region comprising the frequency shift satisfying Formula (4) is taken as the specific region, temperature is analyzed using a frequency shift that excludes at least the case where the frequency shift has an extreme value. This allows performing accurate temperature analysis.

In the present embodiment the Brillouin scattered light spectrum is detected using the BOTDR method, which allows detecting at various times the spectrum of the Brillouin scattered light outputted from the pump light incidence end of the optical fiber 12. The Brillouin scattered light spectrum at various times corresponds to the position along the longitudinal direction of the optical fiber 12, which allows measuring the temperature distribution along the longitudinal direction of the optical fiber 12.

The present invention is not limited to or by the above embodiment, and may encompass various modifications. For instance, the specific region may be a region corresponding to the frequency shift $v_B(T)$ that satisfies the relationship between the frequency shift $v_B(T)$ and the linewidth $\Delta v_B(T)$, and the temperature T, denoted by Formula (8) below.

[Formula 8]

$$\left|\frac{dv_B(T)}{dT}\right| < \left|\frac{d\Delta v_B(T)}{dT}\right| \qquad (8)$$

In a low-temperature region, the linewidth $\Delta v_B(T)$ changes linearly with respect to the temperature T. In the vicinity of the temperature where the frequency shift $v_B(T)$ takes an extreme value, the rate of change of the linewidth $\Delta v_B(T)$ with respect to the temperature T is larger than the rate of change of the frequency shift $v_B(T)$ with respect to the temperature T. As indicated by Formula (8), thus, setting a specific region allows judging whether the frequency shift belongs to the specific region, at least when the temperature derivative of the detected frequency shift is smaller than the temperature derivative of the detected linewidth, and hence temperature analysis can be carried out more accurately.

In the above embodiment, the storage unit 14 may also store frequency shift and the temperature derivative thereof, associated to each other, as region information relating to whether or not the frequency shift belongs to the specific region. In this case, the judgment unit 15 stores a threshold value of the temperature derivative of the frequency shift comprised in the specific region, compares the threshold value with the frequency shift outputted by the detection unit 13, and judges whether or not the frequency shift belongs to the specific region.

Also, when in the above embodiment the judgment result indicating that the frequency shift belongs to the specific region is outputted to the analysis unit 16, the analysis unit 16, which was analyzing temperature using the linewidth, may also analyze temperature using herein linewidth and frequency shift.

Figure 4:
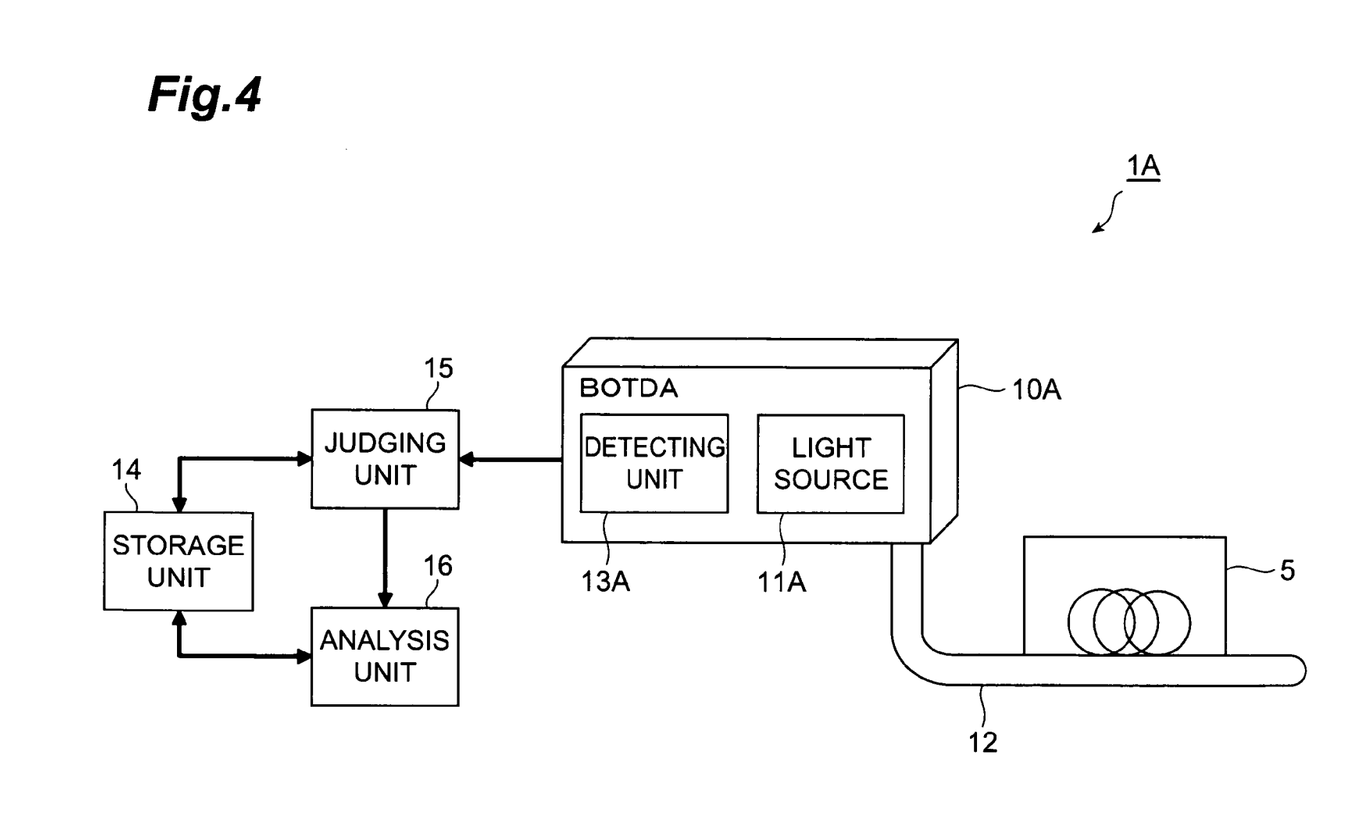
FIG. 4 is a schematic diagram of a modified example of the temperature measuring device according to the present embodiment.

In the above embodiment, the Brillouin scattered light spectrum was detected using a BOTDR device 10 in accordance with the BOTDR method; however, the Brillouin scattered light spectrum may also be detected using a BOTDA device 10A in accordance with the BOTDA method. FIG. 4 illustrates a schematic diagram of a temperature measuring device 1A comprising a BOTDA device 10A.

The BOTDA device 10A comprises a light source 11A and a detection unit 13A. The light source 11A outputs pulsed pump light and probe light as continuous wave, the pump light being incident on a first end of the optical fiber 12, the probe light being incident on the second end of the optical fiber 12. The detection unit 13A measures the change of the probe light on the basis of Brillouin scattering at the pump light incidence end, and detects the spectrum of the Brillouin scattered light as a function of time.

The Brillouin scattered light spectrum is thus detected using the BOTDA method, so that the Brillouin scattered light spectrum outputted from the first end of the optical fiber 12 is detected at various times. The Brillouin scattered light spectrum at various times corresponds to the position along the longitudinal direction of the optical fiber 12, which allows measuring the temperature distribution along the longitudinal direction of the optical fiber 12.

The Brillouin scattered light spectrum can also be detected using a BOCDA device in accordance with a BOCDA method. This can be implemented using a constitution identical to that illustrated in FIG. 4. Herein, the BOCDA device comprises a light source and a detection unit. The light source outputs frequency-modulated continuous waves as pump light and probe light, the pump light being incident on a first end of the optical fiber 12, the probe light being incident on the second end of the optical fiber 12. The detection unit detects the Brillouin scattered light spectrum at a position where the correlation value increases through phase synchronization of the pump light and the probe light. The spectrum of the Brillouin scattered light is detected using the BOCDA method, which allows measuring the temperature distribution along the longitudinal direction of the optical fiber 12.

Figure 5:
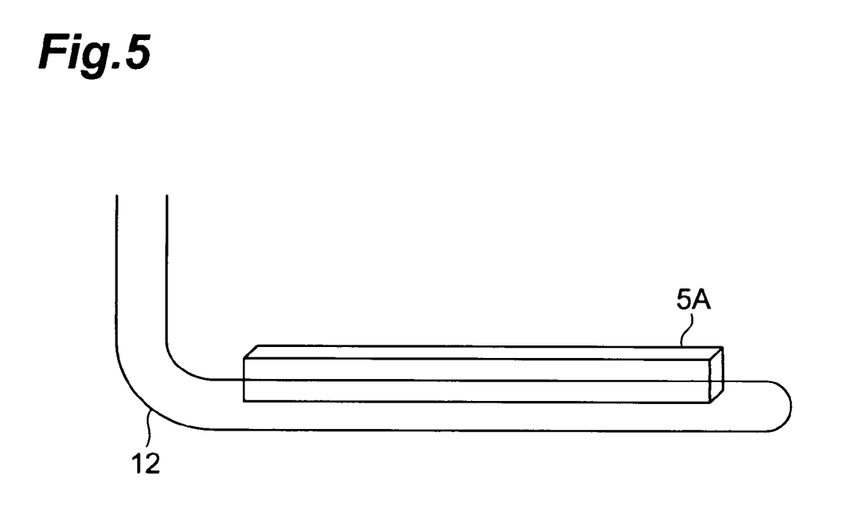
FIG. 5 is a diagram illustrating an arrangement example of the optical fiber in the temperature measurement method according to the present embodiment.
Figure 6:
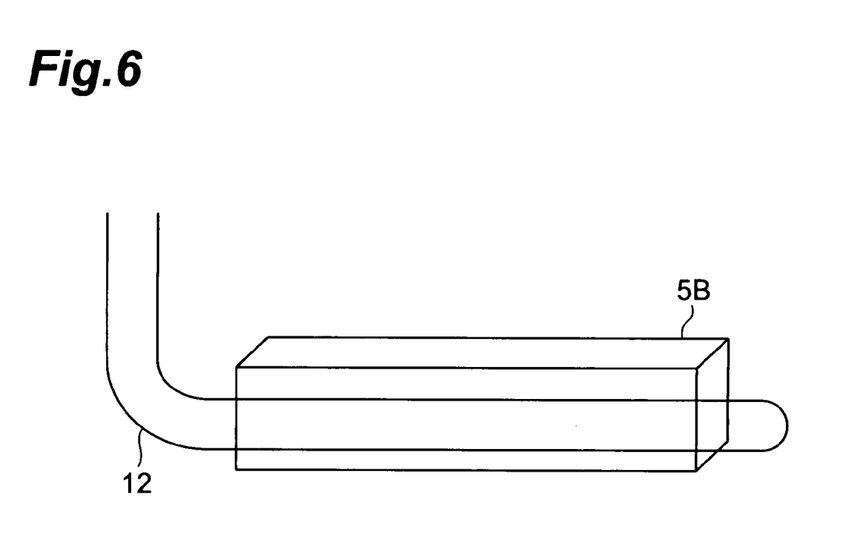
FIG. 6 is a diagram illustrating an arrangement example of the optical fiber in the temperature measurement method according to the present embodiment.
Figure 7:
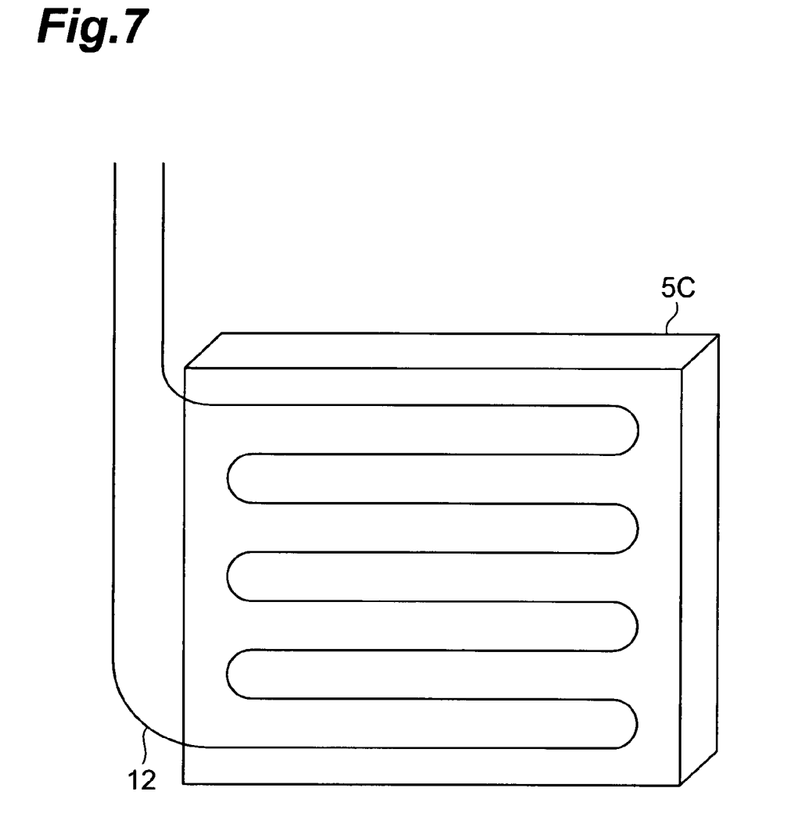
FIG. 7 is a diagram illustrating an arrangement example of the optical fiber in the temperature measurement method according to the present embodiment.
Figure 8:
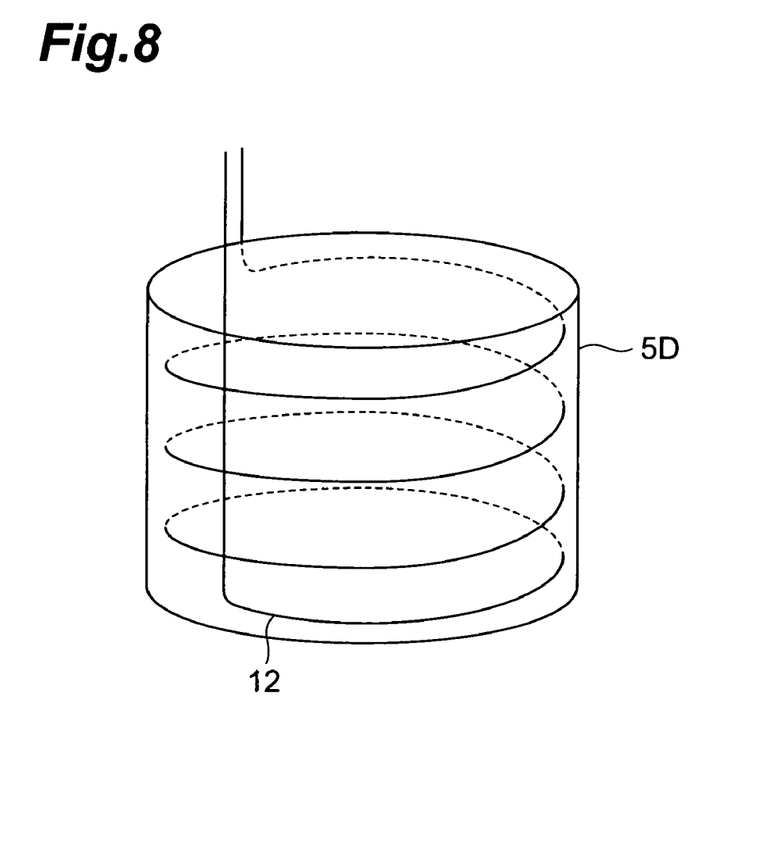
FIG. 8 is a diagram illustrating an arrangement example of the optical fiber in the temperature measurement method according to the present embodiment.

The optical fiber 12 may be arranged as illustrated in FIGS. 5 through 8, in accordance with the shape of the object to be measured 5. FIGS. 5 through 8 are diagrams illustrating arrangement examples of the optical fiber 12 in the temperature measurement method according to the present embodiment. As illustrated in FIG. 5, the optical fiber 12 may be arranged along one direction of an object to be measured 5A. As illustrated in FIG. 6, the optical fiber 12 may be doubly arranged along one direction of an object to be measured 5B. As illustrated in FIG. 7, the optical fiber 12 may be arranged meandering over the surface of an object to be measured 5C. As illustrated in FIG. 8, the optical fiber 12 may be arranged spirally coiled along the side wall of a cylindrical object to be measured 5D. When the object to be measured is hollow, the optical fiber 12 may be arranged on the inner side wall of the object to be measured. The optical fiber 2 may also be embedded in the material that makes up the object to be measured.

Figure 9:
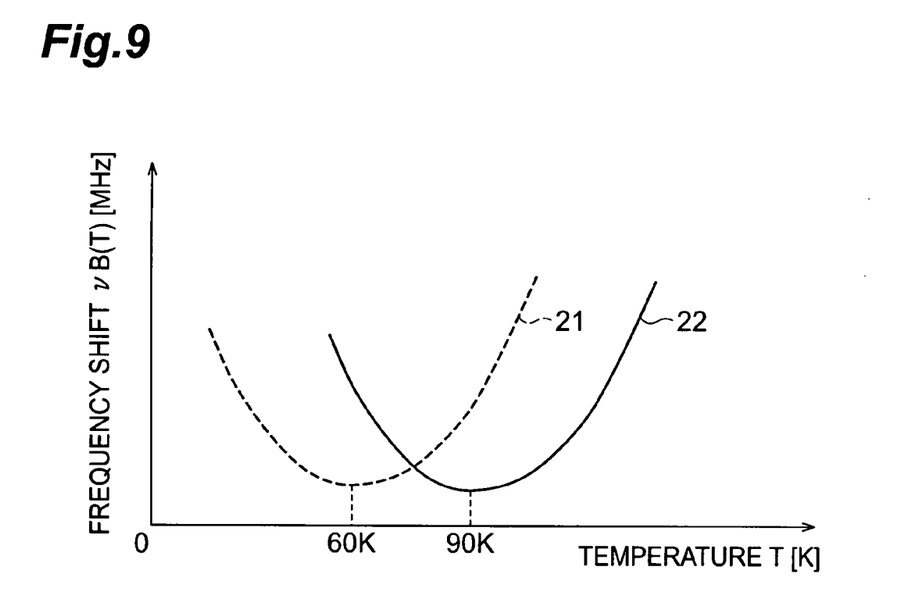
FIG. 9 is a graph illustrating the relationship between temperature and frequency shift of the optical fiber 12 comprised in the temperature measuring device according to the present embodiment.

The temperature at which the optical fiber 12 has an extreme value of frequency shift may also be changed by varying the type and/or amount of dopant added to the core or the cladding of the optical fiber 12. FIG. 9 is a graph illustrating the relationship between temperature and the frequency shift of the optical fiber 12 comprised in the temperature measuring device according to the present embodiment. The X-axis represents the temperature T of the optical fiber, and the Y-axis represents the frequency shift $v_B(T)$.

The dotted curve 21 represents the frequency shift of the Brillouin scattered light spectrum outputted from an optical fiber having zero additive in the optical fiber core. The solid curve 22 represents the frequency shift of the Brillouin scattered light spectrum outputted from an optical fiber having an optical fiber core comprising 20% of $GeO_2$. The extreme value of the curve 21 lies around 60 K, while the extreme value of the curve 22 lies around 90K. The temperature range corresponding to the specific region can thus be changed by using an optical fiber in which the temperature at which the frequency shift takes an extreme value is modified through addition of a dopant.

In the above example, the temperature is measured through analysis of the frequency shift, although herein the peak frequency of the Brillouin spectrum may also be analyzed, i.e. not the frequency shift but the absolute value of the frequency.

As will be evident from the above explanation, the present invention can accommodate various modifications. The appended claims are intended to cover all such modifications and/or improvements that are evident to those skilled in the art and which do not depart from the spirit and scope of the invention.

INDUSTRIAL APPLICABILITY

The present invention allows analyzing more accurately the temperature of a low-temperature region using Brillouin scattering.

The invention claimed is:

1. A temperature measuring device, comprising:
   a light source for outputting light;
   an optical fiber to which light outputted by said light source is inputted, and from which Brillouin scattered light is outputted from said optical fiber in response to said light input;
   detection means for detecting a spectrum of said Brillouin scattered light outputted from said optical fiber;
   judgment means for judging whether or not a frequency shift of the spectrum of said Brillouin scattered light detected by said detection means belongs to a specific region in which the rate of change of the frequency shift with respect to the temperature of said optical fiber is smaller than a predetermined value; and
   analysis means for, when said judgment means judges that said frequency shift does not belong to said specific region, analyzing said temperature in use of said frequency shift, and for, when said judgment means judges that said frequency shift belongs to said specific region, not performing analysis, or analyzing said temperature in use of at least a linewidth of the spectrum of the Brillouin scattered light detected by said detection means.

2. The temperature measurement device according to claim 1, further comprising storage means for storing beforehand region information relating to whether a frequency shift belongs to said specific region, wherein
   said judgment means inputs the stored beforehand region information relating to whether a frequency shift belongs to said specific region and performs judgment on the basis of said region information received from said storage means.

3. The temperature measurement device according to claim 1, wherein
   said specific region used for judgment by said judgment means is a region comprising a frequency shift that satisfies the relationship between frequency shift $v_B(T)$ and temperature T denoted by Formula (1) below:

[Formula 1]

$$\left|\frac{dv_B(T)}{dT}\right| = 0. \quad (1)$$

4. The temperature measurement device according to claim 1, wherein
said specific region used for judgment by said judgment means is a region comprising a frequency shift $v_B(T)$ that satisfies the relationship between frequency shift $v_B(T)$, linewidth $\Delta v_B(T)$ and temperature T denoted by Formula (2) below:

[Formula 2]

$$\left|\frac{dv_B(T)}{dT}\right| < \left|\frac{d\Delta v_B(T)}{dT}\right|. \quad (2)$$

5. A temperature measurement method, comprising:
a detection step of inputting light to an optical fiber and detecting a spectrum of Brillouin scattered light outputted from said optical fiber in response to said light input;
a judgment step of judging whether or not a frequency shift of the spectrum of said Brillouin scattered light detected in said detection step belongs to a specific region in which the rate of change of the frequency shift with respect to the temperature of said optical fiber is smaller than a predetermined value; and
an analysis step of, when in said judgment step it is judged that said frequency shift does not belong to said specific region, analyzing said temperature in use of said frequency shift, and for, when in said judgment step it is judged that said frequency shift belongs to said specific region, not performing analysis, or analyzing said temperature in use of at least a linewidth of the spectrum of the Brillouin scattered light detected in said detection step.

6. The temperature measurement method according to claim 5, wherein a temperature distribution along the longitudinal direction of said optical fiber is measured.

* * * * *